United States Patent
Lim et al.

(10) Patent No.: US 8,676,160 B2
(45) Date of Patent: Mar. 18, 2014

(54) APPARATUS AND METHOD FOR CONTROLLING UE SUPPORTING DUAL MODE

(75) Inventors: Han-na Lim, Seoul (KR); Song-Yean Cho, Seoul (KR); Sung-Ho Choi, Suwon-si (KR); Beom-Sik Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 371 days.

(21) Appl. No.: 12/661,046

(22) Filed: Mar. 10, 2010

(65) Prior Publication Data

US 2010/0234017 A1     Sep. 16, 2010

(30) Foreign Application Priority Data

Mar. 10, 2009   (KR) .................. 10-2009-0020338

(51) Int. Cl.
| | |
|---|---|
| *H04M 1/66* | (2006.01) |
| *H04M 1/00* | (2006.01) |
| *H04W 4/00* | (2009.01) |
| *H04W 36/00* | (2009.01) |
| *H04B 1/38* | (2006.01) |

(52) U.S. Cl.
USPC ............. 455/411; 455/553.1; 455/435.2; 455/436; 455/444; 455/574; 370/331; 370/338

(58) Field of Classification Search
USPC ............. 455/574, 436, 439, 435.1–435.2, 455/414.1–414.2, 410–411, 426.1, 455/456.1–457, 435.1–444, 432.3–433, 455/550.1–553.1; 370/338, 331
See application file for complete search history.

(56) References Cited

U.S. PATENT DOCUMENTS

| | | | |
|---|---|---|---|
| 2006/0089169 A1* | 4/2006 | Tsao et al. ................. | 455/552.1 |
| 2006/0121916 A1* | 6/2006 | Aborn et al. ............... | 455/456.5 |
| 2008/0130598 A1* | 6/2008 | Kalhan ......................... | 370/338 |
| 2008/0181178 A1* | 7/2008 | Shaheen ....................... | 370/331 |
| 2009/0070854 A1* | 3/2009 | Gu et al. .......................... | 726/1 |
| 2009/0168726 A1* | 7/2009 | Thalanany et al. ........... | 370/332 |
| 2009/0279430 A1* | 11/2009 | Huber et al. ............... | 370/230.1 |
| 2009/0305699 A1* | 12/2009 | Deshpande et al. .......... | 455/434 |
| 2010/0118844 A1* | 5/2010 | Jiao et al. ...................... | 370/338 |
| 2011/0312333 A1* | 12/2011 | I'Anson et al. ............ | 455/456.1 |

* cited by examiner

*Primary Examiner* — Vladimir Magloire
*Assistant Examiner* — Michael Mapa (57) ABSTRACT

A method and an apparatus control a UE that supports a dual mode for controlling power consumption. A wireless local area network (WLAN) modem of a user equipment (UE) automatically turns on when the UE detects that the UE has entered into an area (e.g. home) that employs a home network including a femto Node B and a WLAN access point (AP). The method and apparatus may also determine whether a femto identifier received from a Node B of a home network is an identifier registered in a WLAN turn-on list stored in the UE. If the femto identifier is registered in the WLAN turn-on list, the WLAN modem of the UE is turned on.

10 Claims, 7 Drawing Sheets

APPARATUS AND METHOD FOR CONTROLLING UE SUPPORTING DUAL MODE

CROSS-REFERENCE TO RELATED APPLICATION(S) AND CLAIM OF PRIORITY

This application claims the priority under 35 U.S.C. §119(a) of an application entitled "Apparatus And Method For Controlling UE Supporting Dual Mode" filed in the Korean Industrial Property Office on Mar. 10, 2009 and assigned Ser. No. 10-2009-0020338, the contents of which are hereby incorporated by reference.

TECHNICAL FIELD OF THE INVENTION

The present invention relates to a home network, and more particularly to an apparatus and a method for controlling a User Equipment (UE) supporting a dual mode.

BACKGROUND OF THE INVENTION

In general, most users use a Wireless Local Area Network (WLAN) Access Point (AP) in order to configure a home network. The home network may be configured as a personal home network by using, for example, a computer, an Internet Protocol (IP) television (TV), a Portable Multimedia Player (PMP), and the like. The home network uses the WLAN technology for the communication between devices configuring the home network. According to a recent trend, individual users install a femto access point or femto enhanced Node B (eNB) within their home in order to extend the coverage or for a particular use, which causes the femto Node B and a mobile terminal or User Equipment (UE) to be elements having an important effect on the home network service. However, since the WLAN modem consumes a relatively large quantity of battery power in comparison with the conventional mobile communication (e.g. Global System for Mobile communications (GSM), Wideband Code Division Multiple Access (WCDMA), and the like) modems, the WLAN modem is usually kept off in most UEs on which the quantity of battery consumption has a large influence. Therefore, even when a UE enters into a home employing a home network, the UE cannot receive a home network service since the WLAN modem of the UE is off.

There are three conventional solutions used in order to convert the WLAN modem of the UE from the OFF state to the ON state.

The first solution is to always keep the WLAN modem of the UE turned on. The second solution is to periodically convert the WLAN modem of the UE from the OFF state to the ON state and search for a WLAN AP. The third solution is for a user of the UE to convert the WLAN modem of the UE from the OFF state to the ON state, or vice versa, by himself or herself.

However, none of the three solutions can solve the problem of battery consumption of the UE. Especially, the third solution, which requires manual operation by the user. That is, it is cumbersome for the user to convert the WLAN modem of the UE from the OFF state to the ON state. Therefore, there is a requirement for a solution by which the WLAN modem of the UE is automatically turns on to reduce the power consumption as soon as the UE enters into the home.

SUMMARY OF THE INVENTION

To address the above-discussed deficiencies of the prior art, it is a primary object to provide a method and an apparatus for controlling a UE supporting a dual mode, in which a WLAN modem of a UE automatically turns on when the UE detects that the UE has entered into a home employing a home network including a femto Node B and a WLAN AP.

Also, the present invention provides a method and an apparatus for controlling a UE supporting a dual mode, in which a WLAN modem of a UE automatically turns on to reduce the power consumption when the UE detects that the UE has entered into a home employing a home network including a femto Node B and a WLAN AP.

In accordance with an aspect of the present invention, there is provided a method of controlling a User Equipment (UE) supporting a dual mode, the method including: determining whether a femto identifier received from a Node B of a home network is an identifier registered in a Wireless Local Area Network (WLAN) turn-on list stored in the UE; and when the femto identifier is an identifier registered in the WLAN turn-on list, turning on a WLAN modem of the UE.

In accordance with another aspect of the present invention, there is provided a method of controlling a UE supporting a dual mode, the method including: receiving a response message through a Node B from a network in response to a registration request message requesting registration of a location of the UE; determining whether the response message includes a femto capability; and when the response message includes a femto capability, turning on a WLAN modem of the UE.

In accordance with another aspect of the present invention, there is provided an apparatus for controlling a UE supporting a dual mode, the apparatus including: a control unit that determines whether a femto identifier received from a Node B of a home network is an identifier registered in a WLAN turn-on list stored in the UE, and transmits a control signal to a WLAN modem of the UE in order to turn on the WLAN modem when the femto identifier is an identifier registered in the WLAN turn-on list; and the WLAN modem that shifts from a turned-off state to a turned-on state when the WLAN modem has received the control signal from the control unit.

In accordance with another aspect of the present invention, there is provided an apparatus for controlling a UE supporting a dual mode, the apparatus including: a control unit that receives a response message through a Node B from a network in response to a registration request message requesting registration of a location of the UE, determines whether the response message includes a femto capability, and turns on a WLAN modem of the UE when the response message includes a femto capability; and the WLAN modem that shifts from a turned-off state to a turned-on state when the WLAN modem has received the control signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. In the following description, a detailed description of known functions and configurations incorporated herein will be omitted when it may make the subject matter of the present invention rather unclear. Further, various specific definitions found in the following description, such as specific values of packet identifications, contents of displayed information, and such, are provided only to help general understanding of the present invention, and it is apparent to those skilled in the art that the present invention can be implemented without such definitions.

The present invention proposes a method, by which a WLAN modem of a UE automatically turns on when the UE detects that the UE has entered into a home (or area) employing a home network including a femto Node B and a WLAN AP. As used herein, the UE is a dual mode UE having both a mobile communication modem and a WLAN modem, and accesses a WLAN in order to use a home network service within a home when it has entered the home.

Figure 1A:
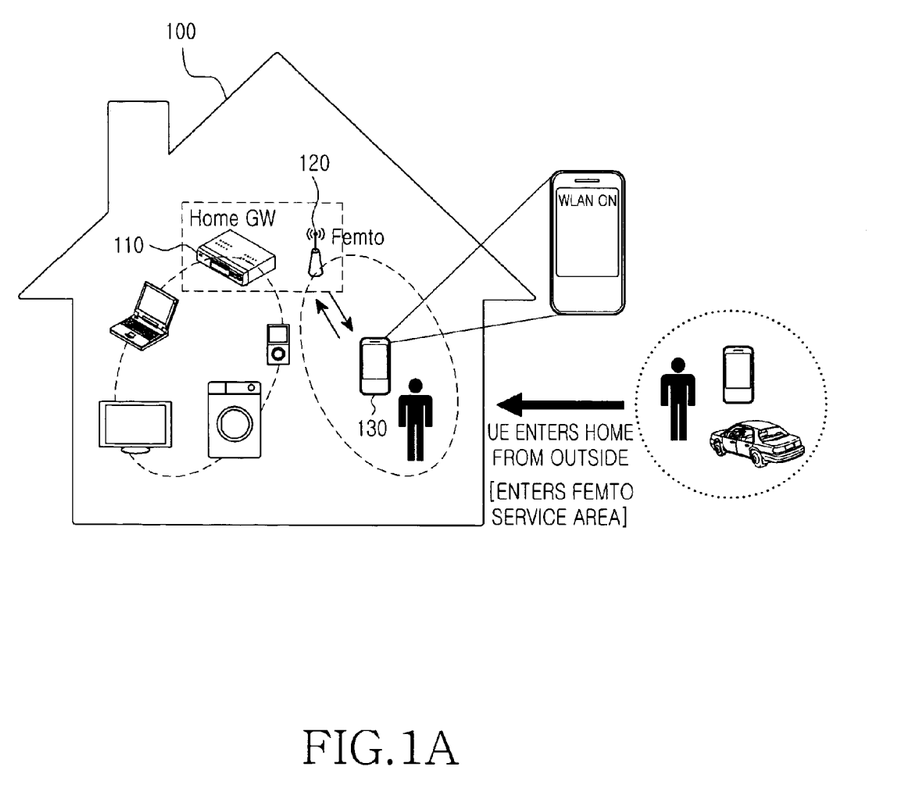
FIGS. 1A and 1B illustrate a system to which the present invention is applied.

FIG. 1A illustrates a home network to which the present invention is applied.

The home network includes a computer, an Internet Protocol (IP) TV, a washing machine, an MP3 player, and the like, connected to a home gateway (home GW) 110 by using a WLAN within a home. That is, the home GW 110 has a WLAN AP function. Further, a femto access point or femto enhanced Node B (eNB) 120 is installed in the home 100. That is, a home network including a WLAN AP and the femto eNB 120 is located within the home 100.

Figure 1B:
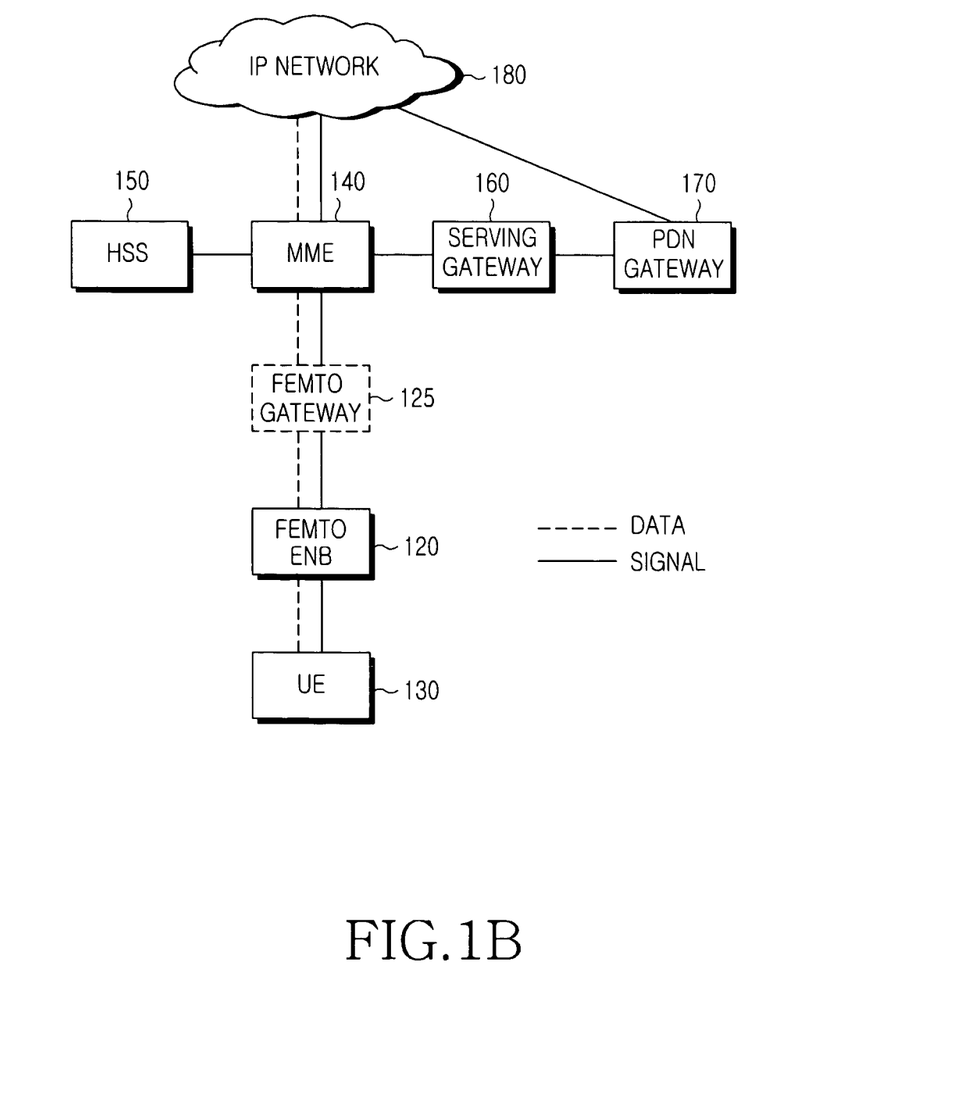

FIG. 1B illustrates a route for access to an Internet network through a femto Node B. In FIG. 1B, the solid line indicates a signaling route and the dashed line indicates a data route.

The UE 130 refers to a User Equipment, and the eNB/Femto 120 refers to a femto Node B or a femto access point. Further, the Mobility Management Entity (MME) 140 refers to an entity managing a mobility of the UE, and the Home Subscriber Server (HSS) 150 refers to an entity managing the subscriber information.

When the UE 130 detects that it has entered a home as shown in FIG. 1A, that is, when the UE 130 detects that it has entered a femto service area, the UE 130 determines whether a femto list of femto Node Bs, which it can access, includes the femto identifier broadcasted from the femto Node B 120. If the femto list includes the femto identifier, the UE 130 registers itself to the femto Node B 120. The femto identifier includes a Closed Subscriber Group (CSG) identifier (ID), and the femto list includes an allowed CSG list.

The present invention proposes two embodiments according to the reference based on which the UE turns on the WLAN.

According to a first embodiment of the present invention, if the received femto identifier is included in the WLAN-turn-on list stored in the UE 130, the UE 130 turns on its own WLAN modem. Then, the UE 130, having turned on the WLAN modem, registers to its own network service and receives a service from the network according to preset conditions.

According to a second embodiment of the present invention, the network transmits a femto capability, which is an indicator commanding UEs to turn on the WLAN modem. The femto capability is an indicator used by the network in order to inform UEs of the functions supported by the femto Node B to which the UE 130 wants to register. The femto capability may include other functions supported by the femto Node B as well as the WLAN. The network inserts an indicator reporting that the femto Node B 120 has a WLAN function in a response message to the registration message of the UE 130 and then sends a response message to the UE 130, and the UE 130 detects the femto capability included in the response message and then turns on its own WLAN modem. The UE 130 having turned on the WLAN modem registers itself to the home network service according to the setup and then receives the service from the network.

As used herein, the femto Node B 120 may be a home eNB (HeNB) of the System Architecture Evolution/Long Term Evolution (SAE/LTE) system, although the present invention is not limited thereto. As used herein, it is assumed that the UE 130 is a dual mode UE capable of supporting both the mobile communication system and the WLAN and that the UE 130 accesses a WLAN in order to access a home network service within a home when it has entered a femto service area (within the home) from the outside. An example of the mobile communication system is the SAE/LTE system.

In the SAE/LTE system, the UE 130 has a Universal Subscriber Identification Module (USIM) storing a femto list including femto Node Bs which the UE 130 itself can access. The femto list including the femto Node Bs which the UE 130 itself can access includes an allowed Closed Subscriber Group (CSG) list. The allowed CSG list corresponds to a list of HeNBs, which a service provider appoints in advance, which a user can add HeNBs to, and which the UE 130 can access. A CSG ID is allocated to an HeNB and used to identify the HeNB. The HeNB (including CSG cell concept) broadcasts the CSG ID and informs the UE 130 of the existence of itself. That is, the UE 130 is allowed to access only the CSGs included in the allowed CSG list.

Figure 2:
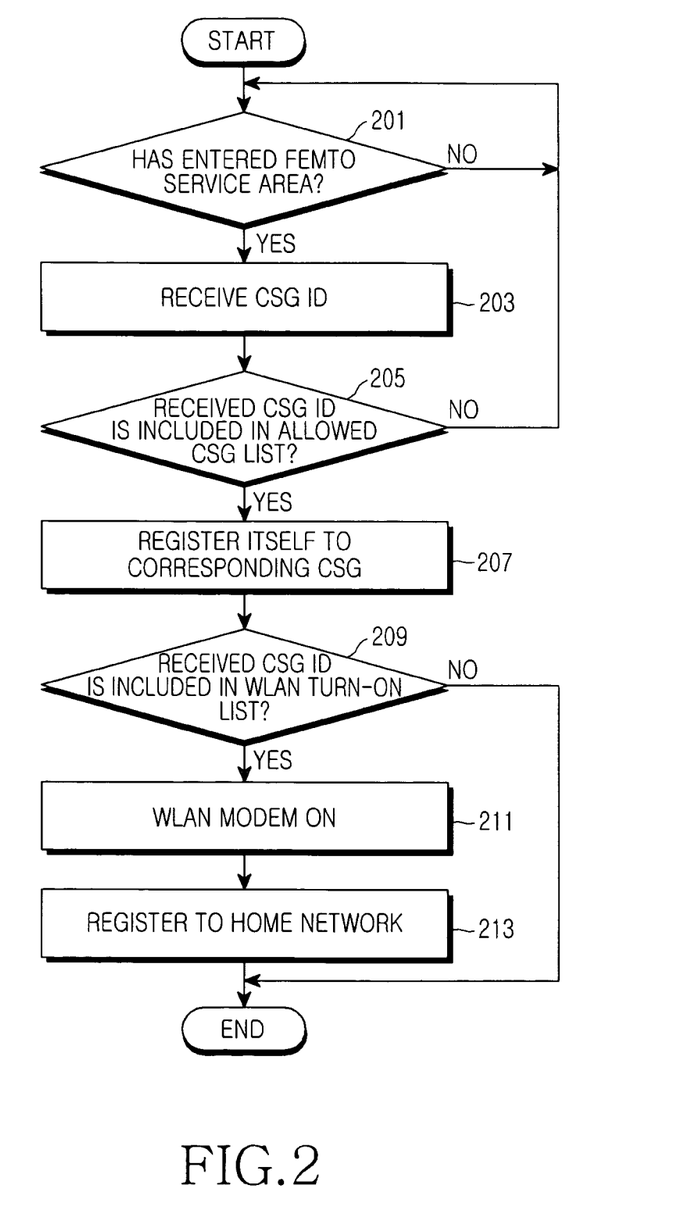
FIG. 2 illustrates an operation of a UE according to a first embodiment of the present invention.

FIG. 2 illustrates an operation of a UE according to a first embodiment of the present invention.

In block 201, the UE 130 determines whether it has entered a femto service area. When the UE 130 has entered the femto service area, the UE 130 receives the CSG ID broadcasted by the HeNB in block 203. In block 205, the UE 130 determines whether the received CSG ID is included in the allowed CSG list of the UE 130, that is, the list of CSGs allowed for the UE 130. When the received CSG ID is not included in the allowed CSG list, the UE 130 returns to block 201. However, when the received CSG ID is included in the allowed CSG list, the UE 130 registers itself to a corresponding HeNB in block 207. As used herein, the registration of the UE 130 to a corresponding HeNB signifies that the UE 130 receives a CSG ID and registers the location of the UE 130 to the network through a Tracking Area Update (TAU), and the like, thereby reporting to the network that the UE 130 is located within the service area of the HeNB. When the registration has been completed, the UE 130 determines whether the received CSG ID is included in its own WLAN turn-on list. When the received CSG ID is not included in its own WLAN turn-on list, the UE 130 terminates all the operations. However, when the received CSG ID is included in its own WLAN turn-on list, the UE 130 turns on the WLAN modem in block 211. In block 213, the UE 130 registers itself to the home network.

The WLAN turn-on list, which is proposed by the present invention, includes CSG IDs, by which the UE turns on the WLAN, and is stored in the UE. The WLAN turn-on list may be stored, for example, in the USIM of the UE 130, or in any other storage media of the UE 130. Further, the WLAN turn-on list may be configured by a user of the UE 130 or a service provider. Further, a description on a scheme of registering the UE 130 having turned on the WLAN to the home network in order to use the home network service is omitted since it is beyond the range of the proposal by the present invention. However, the present invention includes the process of registration of the UE 130 to the home network.

Figure 3:
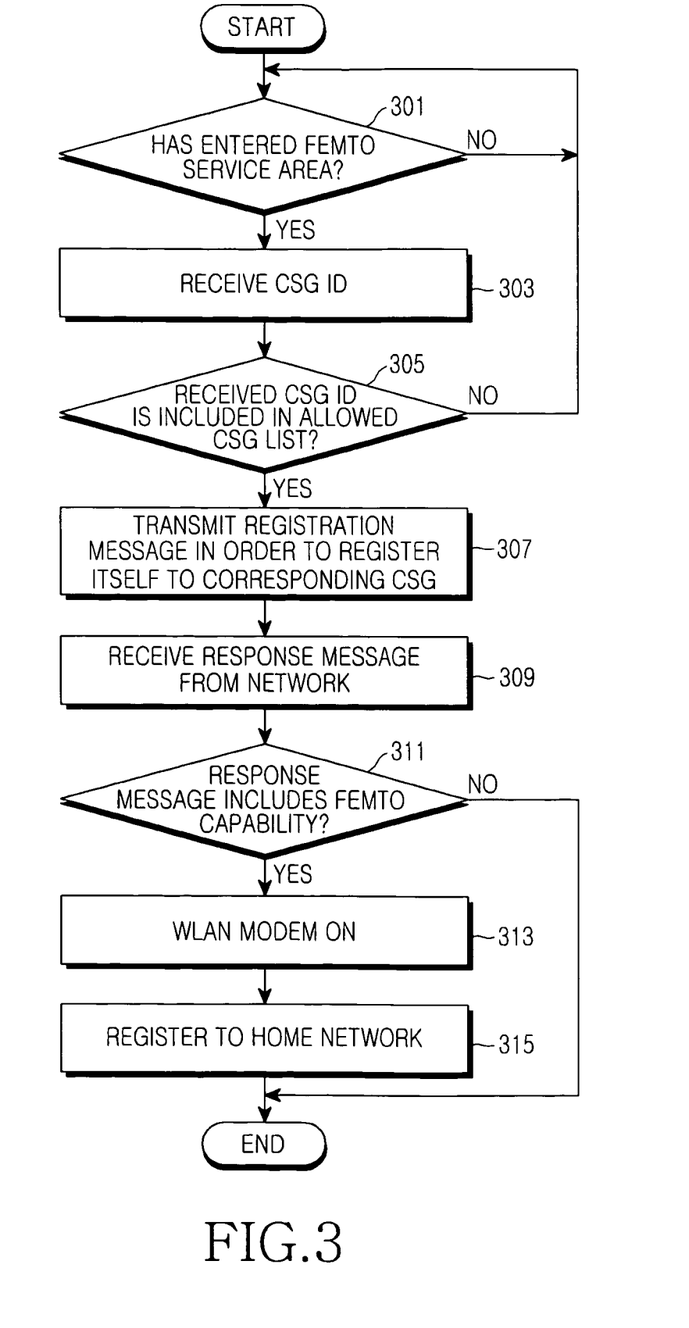
FIG. 3 illustrates an operation of a UE according to a second embodiment of the present invention.

FIG. 3 illustrates an operation of a UE 130 according to an embodiment of the present invention.

In block 301, the UE 130 determines whether it has entered a femto service area. When the UE 130 has entered the femto service area, the UE 130 receives the CSG ID broadcasted by the HeNB in block 303. In block 305, the UE 130 determines whether the received CSG ID is included in the list of CSGs allowed for the UE 130. When the received CSG ID is not included in the allowed CSG list, the UE 130 returns to block 301. However, when the received CSG ID is included in the allowed CSG list, the UE 130 transmits a registration message to the network through the HeNB in order to register itself to a corresponding HeNB in block 307. At this time, the UE 130 transmits a Tracking Area Update (TAU) Request message to the network. In a mobile communication system according to the present invention, the Mobility Management Entity (MME) 140, which manages the mobility of the UE 130, receives the TAU Report message.

In block 309, the UE 130 receives a response message to the registration message from the network. In block 311, the UE 130 determines whether the response message includes a femto capability. When the response message does not include a femto capability, the UE 130 terminates all operations. However, when the response message includes a femto capability, the UE 130 turns on the WLAN modem in block 313. The femto capability includes information on whether the femto Node B supports the WLAN. In block 315, the UE 130 registers itself to the home network.

A description on a scheme of registering the UE 130 having turned on the WLAN to the home network gateway in order to use the home network service is omitted since it is beyond the scope of the proposal by the present invention. However, the present invention includes the process of registration of the UE 130 to the home network.

Figure 4:
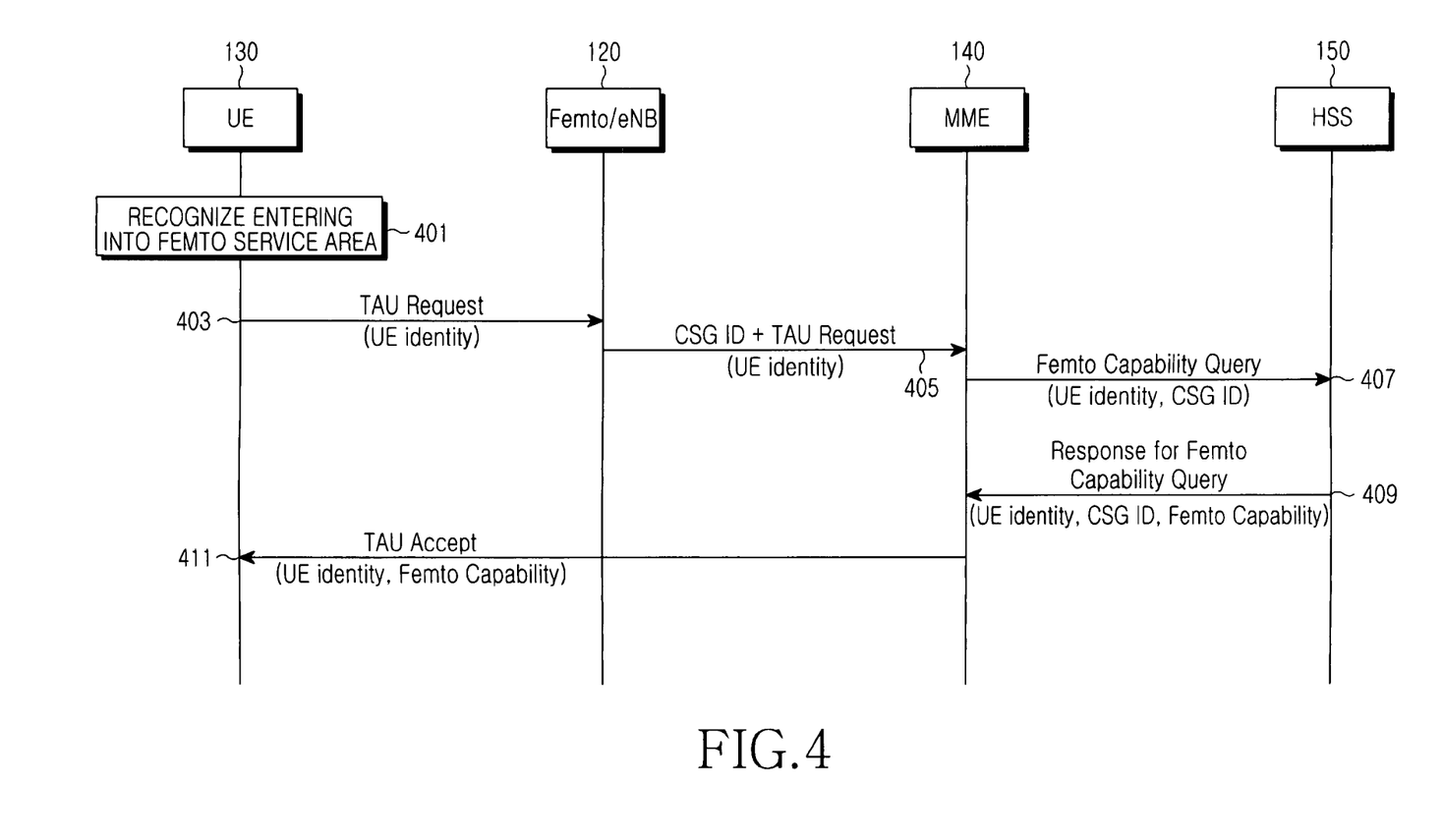
FIG. 4 illustrates an example of reception of a femto capability by a UE from a network in an LTE system according to the second embodiment of the present invention.

FIG. 4 illustrates an example of reception of a femto capability by a UE 130 from a network in an LTE system according to the second embodiment of the present invention.

In block 401, the UE 130 recognizes that it has entered a femto service area. In order to register itself in a corresponding CSG, the UE 130 transmits a TAU Request message 403 to the femto Node B 120. In SI message 405, the femto Node B 120 transmits the received TAU Request together with its own CSG ID to the MME 140, which is an entity managing the mobility of the UE 130, through the SI, which is an interface between the femto Node B 120 and the MME 140. Although the message type of the message (NAS message 403) and the message (SI message 405) are different from each other, they are illustrated in the same drawing for convenience of description.

The MME 140, having received the TAU message 405, transmits a femto capability query message 407 to the HSS 150. That is, the MME 140 inquires to the HSS 150 of the capability of the femto Node B 120. When the HSS 150 is not aware of the femto capability, the HSS 150 transmits a response message to the femto capability query message, which reports that it is unaware of the femto capability. However, when the HSS 150 is aware of the femto capability, the HSS 150 transmits a response message including the femto capability in response to the femto capability query message 409. At this time, the MME 140 transmits a TAU accept message 411 including the capability of the femto Node B to the UE 130.

Figure 5:
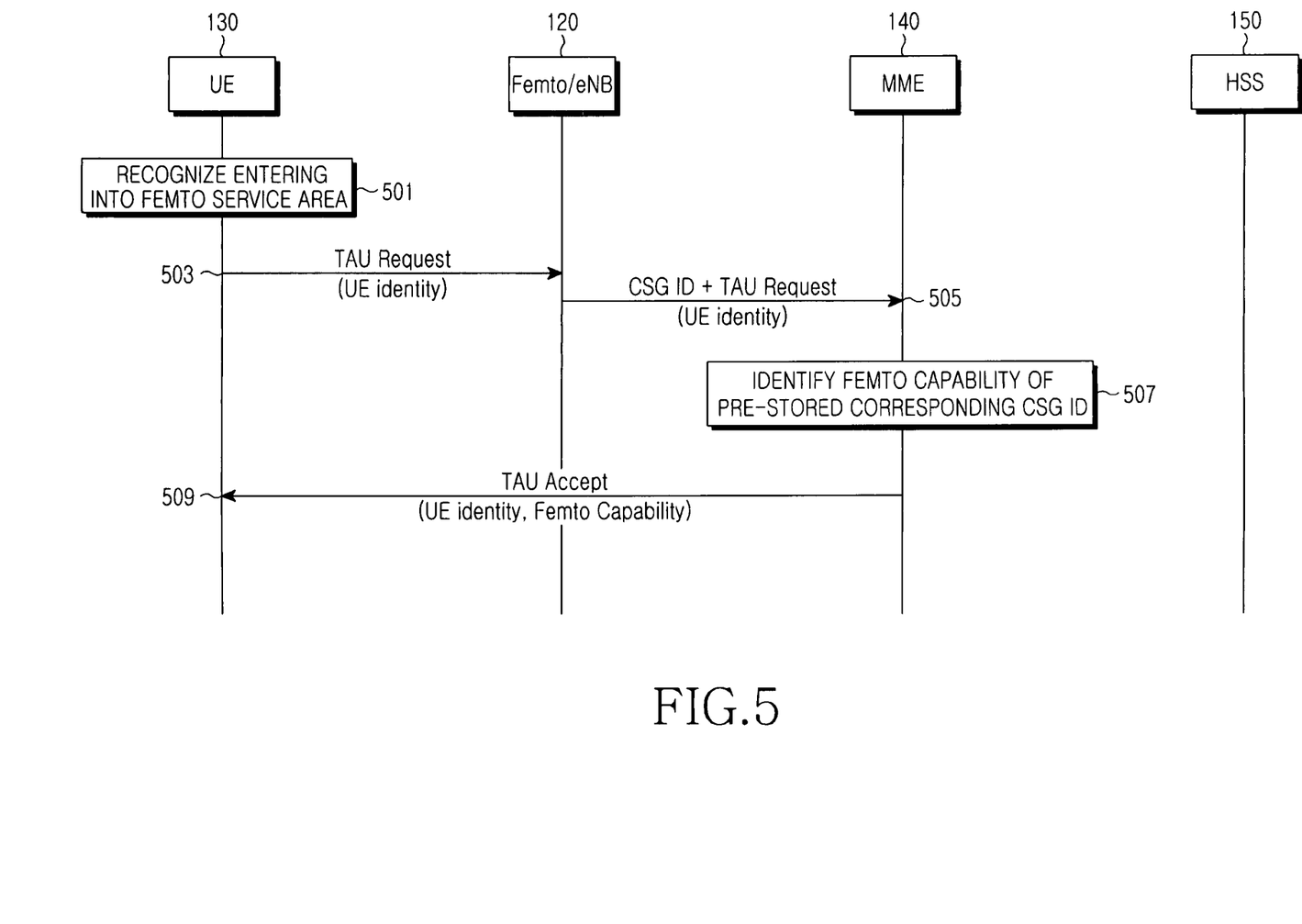
FIG. 5 illustrates another example of reception of a femto capability by a UE from a network in an LTE system according to the second embodiment of the present invention.

FIG. 5 illustrates another example of reception of a femto capability by a UE 130 from a network in an LTE system according to the second embodiment of the present invention.

Block 501 and messages 502 to 505 of FIG. 5 are analogous to block 401 and messages 402 to 405 of FIG. 4, so a detailed description thereof is omitted here.

The MME 140, having received a SI message 505, identifies a pre-stored femto capability of a corresponding CSG ID in block 507. Identifying a pre-stored femto capability of a corresponding CSG ID is possible when the MME is aware of the femto capability in advance. In order for the MME 140 having received the CSG ID through an SI message to know the capability of a corresponding femto Node B, the femto Node B 120 informs the MME 140 of the capability of the femto Node B 120 at the initial stage at which the femto Node B 120 is installed. The MME 140 transmits a TAU Accept message 509 including the pre-stored capability of the corresponding femto Node B to the UE 130.

Figure 6:
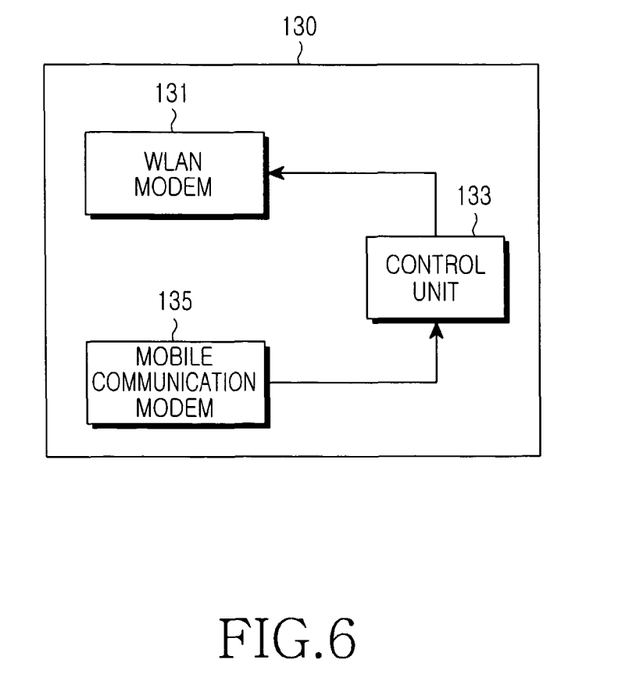
FIG. 6 illustrates the construction of a UE according to an embodiment of the present invention.

FIG. 6 illustrates some components of UE 130 according to an embodiment of the present invention.

The UE 130 includes a WLAN modem 131, a mobile communication modem 135, and a control unit 133.

According to the first and second embodiments of the present invention, when the control unit 133 of the UE 130 has received information for turning on the WLAN modem 131 from the mobile communication modem 135, the control unit 133 transmits a control signal to the WLAN modem 131 in order to turn on the WLAN modem 131. That is, according to the first embodiment of the present invention, the control unit 133 determines whether the femto identifier received from a femto Node B 120 of a home network is a femto identifier registered in the WLAN turn-on list stored in the UE 130, and transmits a control signal to the WLAN modem 131 of the UE 130 in order to turn on the WLAN modem 131 when the received femto identifier is a registered femto identifier.

According to the second embodiment of the present invention, the control unit 133 receives a response message in response to a registration request message for requesting registration of the location of the UE 130 through an access point or a Node B 120 from the network, determines whether the response message includes a femto capability, and transmits a control signal to the WLAN modem 131 of the UE 130 in order to turn on the WLAN modem 131 when the response message includes a femto capability.

According to the first and second embodiments of the present invention, when the WLAN modem 131 receives the control signal, the WLAN modem 131 shifts from the turned-off state to the turned-on state.

Although the above description discusses turning-on of the WLAN modem 131 of a dual mode UE having both the mobile communication modem 135 and the WLAN modem 131, the present invention is also applicable to another UE employing another technology other than the WLAN, such as a dual mode UE having a mobile communication modem and a Bluetooth function.

According to the present invention, when a UE detects that it has entered a home having a home network including a femto Node B and a WLAN AP, a WLAN modem of the UE is automatically turned on, such that it is possible to reduce power consumption.

Further, according to the present invention, a user can wirelessly synchronize particular data, such as an address book or a schedule of home network devices, with a UE.

Moreover, when the schedule has been synchronized, each of home network device can report the synchronized schedule to the user.

In addition, according to the present invention, a user can access and work on data of a wirelessly connected UE, such as a laptop computer. For example, by wirelessly transmitting a stored image to an IP TV, the user can view and enjoy a movie through the TV.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of controlling a User Equipment (UE) that supports a dual mode, the method comprising:
upon entering a home network, receiving a CSG (Closed Subscriber Group) ID from a CSG cell;
determining whether the received CSG ID is included in a list of CSGs allowed for the UE;
if the received CSG ID is included in the list, transmitting a registration request message to a Mobility Management Entity (MME) through a femto Node B in order to register the UE to the CSG cell;
receiving a response message through the femto Node B from the MME in response to the registration request message requesting registration of a location of the UE;
determining whether the response message includes a femto capability indicator that was inserted by the MME into the response message before transmission of the response message to the UE; and
turning on a Wireless Local Area Network (WLAN) modem of the UE when the response message includes the femto capability,
wherein the femto capability indicator inserted in the response message indicates whether the femto Node B supports the WLAN, and
wherein the registration request message is transmitted with the CSG ID included in the list of CSGs allowed.

2. The method of claim 1, further comprising transmitting a Tracking Area Update (TAU) request message to a home network.

3. The method of claim 2, wherein the TAU is received at the MME.

4. The method of claim 3, wherein the response message originates at a home subscriber server (HSS) and is transmitted to the UE through the MME.

5. The method of claim 1, wherein the femto capability includes an indicator commanding to turn on the WLAN modem.

6. An apparatus for controlling a User Equipment (UE) that supports a dual mode, the apparatus comprising:
a control unit configured to:
upon entering a home network, receive a CSG (Closed Subscriber Group) ID from a CSG cell,
determine whether the received CSG ID is included in a list of CSGs allowed for the UE,
if the received CSG ID is included in the list, transmit a registration request message to a Mobility Management Entity (MME) through a femto Node B in order to register the UE to the CSG cell,
receive a response message through the femto Node B from the MME in response to the registration request message requesting registration of a location of the UE,
determine whether the response message includes a femto capability indicator that was inserted by the MME into the response message before transmission of the response message to the UE, and
transmit a control signal to a Wireless Local Area Network (WLAN) modem of the UE to turn on the WLAN modem of the UE when the response message include& the femto capability; and
the WLAN modem configured to shift from a turned-off state to a turned-on state when the WLAN modem has received the control signal to turn on the WLAN modem,
wherein the femto capability indicator inserted in the response message indicates whether the femto Node B supports the WLAN, and
wherein the registration request message is transmitted with the CSG ID included in the list of CSGs allowed.

7. The apparatus of claim 6, the control unit further configured to transmit a Tracking Area Update (TAU) request message to the MME.

8. The apparatus of claim 7, wherein the TAU is received at the MME.

9. The apparatus of claim 8, wherein the response message originates at a home subscriber server (HSS) and is transmitted to the UE through the MME.

10. The apparatus of claim 6, wherein the femtu capability includes an indicator commanding to turn on the WLAN modem.

* * * * *